(12) United States Patent
Pham et al.

(10) Patent No.: US 7,779,309 B2
(45) Date of Patent: Aug. 17, 2010

(54) CORRELATING COMPLEX ERRORS WITH GENERALIZED END-USER TASKS

(75) Inventors: Bernard Pham, Kirkland, WA (US);
Eric B. Watson, Redmond, WA (US);
Zhiyi Xie, Shanghai (CN)

(73) Assignee: Workman Nydegger, Redmond, WA (US)

( * ) Notice: Subject to any disclaimer, the term of this patent is extended or adjusted under 35 U.S.C. 154(b) by 434 days.

(21) Appl. No.: 11/936,533

(22) Filed: Nov. 7, 2007

(65) Prior Publication Data

US 2009/0119545 A1 May 7, 2009

(51) Int. Cl.
*G06F 11/00* (2006.01)
(52) U.S. Cl. ........................................................ 714/48
(58) Field of Classification Search ........................ None
See application file for complete search history.

(56) References Cited

U.S. PATENT DOCUMENTS

| 6,675,315 | B1 | 1/2004 | Semler et al. | |
|---|---|---|---|---|
| 6,687,847 | B1 | 2/2004 | Aguilera et al. | |
| 6,721,907 | B2 | 4/2004 | Earl | |
| 6,789,114 | B1 | 9/2004 | Garg et al. | |
| 6,950,867 | B1 | 9/2005 | Strohwig et al. | |
| 6,959,265 | B1 | 10/2005 | Candela et al. | |
| 7,171,672 | B2 | 1/2007 | Just | |
| 2002/0073364 | A1* | 6/2002 | Katagiri et al. | 714/48 |
| 2004/0153703 | A1 | 8/2004 | Vigue et al. | |
| 2005/0114501 | A1 | 5/2005 | Raden et al. | |
| 2005/0216793 | A1 | 9/2005 | Entin et al. | |

OTHER PUBLICATIONS

"A Fault Detection Service for Wide Area Distributed Computations," by Paul Stelling and Craig Lee of The Aerospace Corporation, El Segundo, California; Ian Foster and Gregor Von Laszewski of Mathematics and Computer Science, Argonne National Laboratory, Argonne, Illinois; and Carl Kesselman of Information Sciences Institute, University of Southern California, Marina Del Rey, California, [online] [retrieved on Oct. 5, 2007], 11 pgs. Retrieved from the Internet: ftp://ftp.globus.org/pub/globus/papers/hbm.pdf.

(Continued)

*Primary Examiner*—Michael C Maskulinski

(57) ABSTRACT

A system for reporting and/or displaying errors in a system that affect end-user tasks includes mechanisms for gathering, interpreting and displaying application status information in a convenient display. In one implementation, for example, distributed application programs in a system are configured to provide status reports (e.g., positive, negative, pending) to a centralized reporting service. The centralized service stores the status information in a database. An event interpreter module queries the database to identify the status of certain application components that affect or otherwise implicate performance of generalized end-user tasks, such as sending/receiving email, logging-in to the network, accessing the internet, remote computer management, or the like. A graphical user interface can then display this information to the administrator in a way that immediately indicates what end-user tasks might be affected by failure or correct execution of a given application component, as well as suggested corrective action as needed.

21 Claims, 3 Drawing Sheets

OTHER PUBLICATIONS

"An Architecture-Based Approach to Self-Adaptive Software," by Peyman Oreizy, Michael M. Gorlick, Richard N. Taylor, Dennis Heimbigner, Gregory Johnson, Nenad Medvidovic, Alex Quillici, David S. Rosenblum and Alexander L. Wolf, May-Jun. 1999 IEEE Intelligent Systems, [online] [retrieved on Oct. 5, 2007], p. 54 through 62. Retrieved from the Internet: http://sunset.usc.edu/~neno/publications/ieee-is99.pdf.

"Standards Development for Condition-Based Maintenance Systems," by Michael Thurston and Mitchell Lebold, Date Unknown, Applied Research Laboratory, Penn State University, State College, Pennsylvania, [online] [retrieved on Oct. 5, 2007], 11 pgs. Retrieved from the Internet: http://www.osacbm.org/Documents/ConfPapers/MFPT2001_OSACBM_FinalPaper.pdf.

* cited by examiner

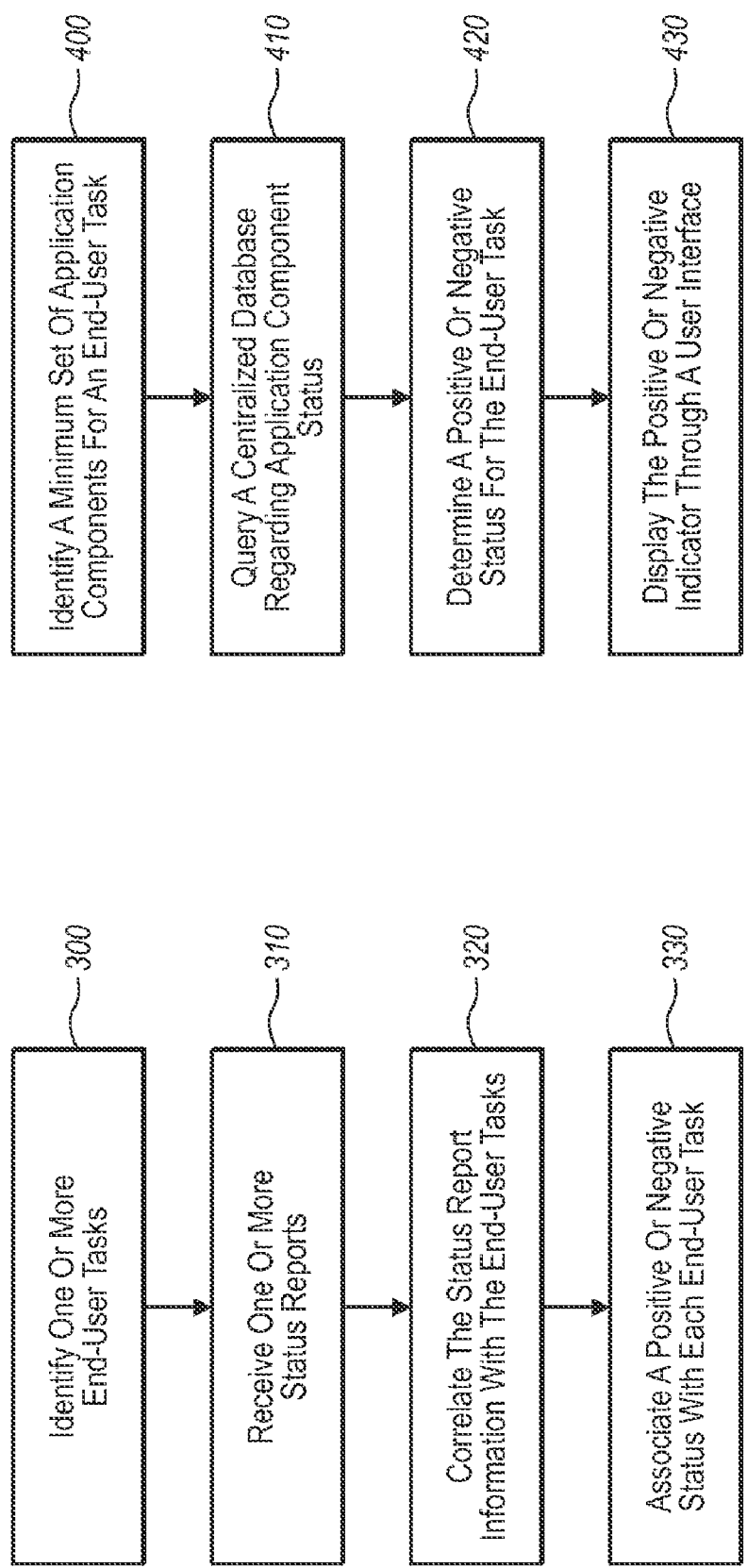

CORRELATING COMPLEX ERRORS WITH GENERALIZED END-USER TASKS

CROSS-REFERENCE TO RELATED APPLICATIONS

N/A

BACKGROUND

Background and Relevant Art

Recent trends in computer/network system design include the use of distributed application programs, and distributed processing environments. In such environments, an organization might implement an application program, or even a system of application programs, that include several different components that operate separately (or at least partly separate) from each other, often on different computer systems or servers entirely. For example, an organization might operate a single distributed email application program to handle the entire organization's needs, where the email application has several different components operating on one or multiple different servers.

In addition, there is often a great deal of dependency between components and different application programs. For example, one email application program component may be configured to operate appropriately only if a different application component used for network access is operating appropriately, which, in turn, might depend on the operability of one or more network firewall components. Thus, it is often the case that tasks performed by users in the organization, such as sending and receiving email, logging-in to the domain, etc., can depend on the individual operability of a long string of different applications and/or different application program components.

One can appreciate, therefore, that when an error occurs in any one of the different components needed for a particular task, it can be difficult to troubleshoot what exactly is happening, and/or how this may affect other applications, application components, or even end-user tasks. For example, conventional application programs may be configured to generate error reports that are sent to some application-specific error reception module. The generated error reports usually contain some application-specific technical data that names the filename of the failing component, and some sort of numerical error code associated with the failure event. In a large, enterprise-style organization, a system administrator specifically trained and hired to manage that particular application may then diagnose the error, and determine a solution for the error. Smaller, more medium-sized organizations, however, usually do not have such specially-trained application administrators that can do this level of work, particularly when considering several different application programs.

In particular, smaller, more moderately-sized organizations tend to have one or few system administrators for managing all of the system resources, and such administrators tend to have generalized skill sets. Even where the administrators are specially trained in a specific application program, the organization will often need such administrators to manage a range of different application programs and components with which the administrators may be unfamiliar except on a very basic level. As a result, when an application program in such smaller organizations generates an error, the administrators often have difficulty troubleshooting and fixing the error in a reasonably quick amount of time.

Such delays in fixing an error can be exacerbated by a number of different factors. For example, system administrators in smaller organizations already tend to be stretched thin as they continually ensure that users have network login access, internet connectivity, and other communication capabilities for telephone and email systems. Thus, when a system administrator in such an organization receives an undetermined error message, it may not be readily apparent that the error message relates to something of immediate concern (e.g., internet or email access), and the administrator may delay working on the error. In addition, there is no guarantee the administrator will actually receive the error in the first instance without in-depth searching, or, alternatively, ascertain the error when an end-user approaches the administrator with an inability to perform a routine task.

For example, a user may approach a system administrator with a problem about logging-in to the network, or otherwise accessing email. To identify how to fix the error for the user in a distributed application environment, the system administrator may need to check several different application program error logs or repositories. Although there are some application programs that centralize or standardize much of this error reporting information, the system administrator may still have difficulty identifying what each error message means, and to what given application program the error message relates. That is, even if the administrator is able to find an error report, there is no guarantee that the administrator will be able to deduce the relevant problems from the error report. Furthermore, each different system administrator may be inclined to interpret the error reports differently, which can result in inconsistent or error prone solutions the next time the error arises.

Thus, simply centralizing the error reporting is usually insufficient, particularly for generalized system administrators who may be untrained in each specific application program they manage. Accordingly, there are a number of difficulties with managing errors and functionality within small to medium-sized networks/organizations that can be addressed.

BRIEF SUMMARY

Implementations of the present invention provide systems, methods, and computer program products configured to efficiently report various computer system operability metrics in a human-readable, easy to understand way. For example, one implementation of a system is configured to collect status reports (e.g., error reports) from one or more application programs into a centralized location, and interpret the error reports in terms of generalized, end-user tasks. The system then associates the generalized end-user tasks, such as sending and receiving email, or logging-in to a network, etc. with a positive or negative (or undetermined) designation. The system further includes one or more user interfaces (e.g., a dashboard) that continually display updated system health information, which indicates which generalized end-user tasks may be working properly, or otherwise implicated by problems identified with application components.

For example, a method of automatically determining a positive or negative status of one or more generalized, end-user tasks can include identifying one or more end-user tasks to be performed in a computerized environment. In this case, each of the one or more end-user tasks involves execution of a corresponding set of one or more distributed application components. The method can also involve receiving one or more status reports from the plurality of distributed application programs. The one or more status reports provide information regarding execution of one or more distributed application program components.

In addition, the method can involve correlating the information of the one or more status reports with the one or more end-user tasks. Furthermore, the method can involve associating a positive, negative, or pending status with at least one of the one or more end-user tasks based on the correlated information. The associated status indicates whether the corresponding end-user task can be performed.

Similarly, a method of displaying one or more graphics that indicate whether generalized end-user tasks can be performed can include identifying one or more distributed application programs and a minimum set of one or more distributed application components corresponding to performance of any one or more generalized end-user tasks. The method can also include querying a centralized database comprising information corresponding to one or more status reports received from the one or more distributed application programs. In addition, the method can include determining from the results of the query a recent positive, negative, or pending status of at least one end-user task. Furthermore, the method can include displaying through a graphical user interface the positive, negative, or pending status indicator associated with the at least one end-user task. The positive, negative, or pending status indicator identifies whether users in the computerized environment can perform the end-user task.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flowchart comprising one or more acts in a method in accordance with an implementation of the present invention of determining the status of one or more end-user tasks based on collected status reports; and FIG. 4 illustrates a flowchart comprising one or more acts in a method in accordance with an implementation of the present invention of displaying the status of one or more end-user tasks in a graphical user interface.

DETAILED DESCRIPTION

Figure 1:
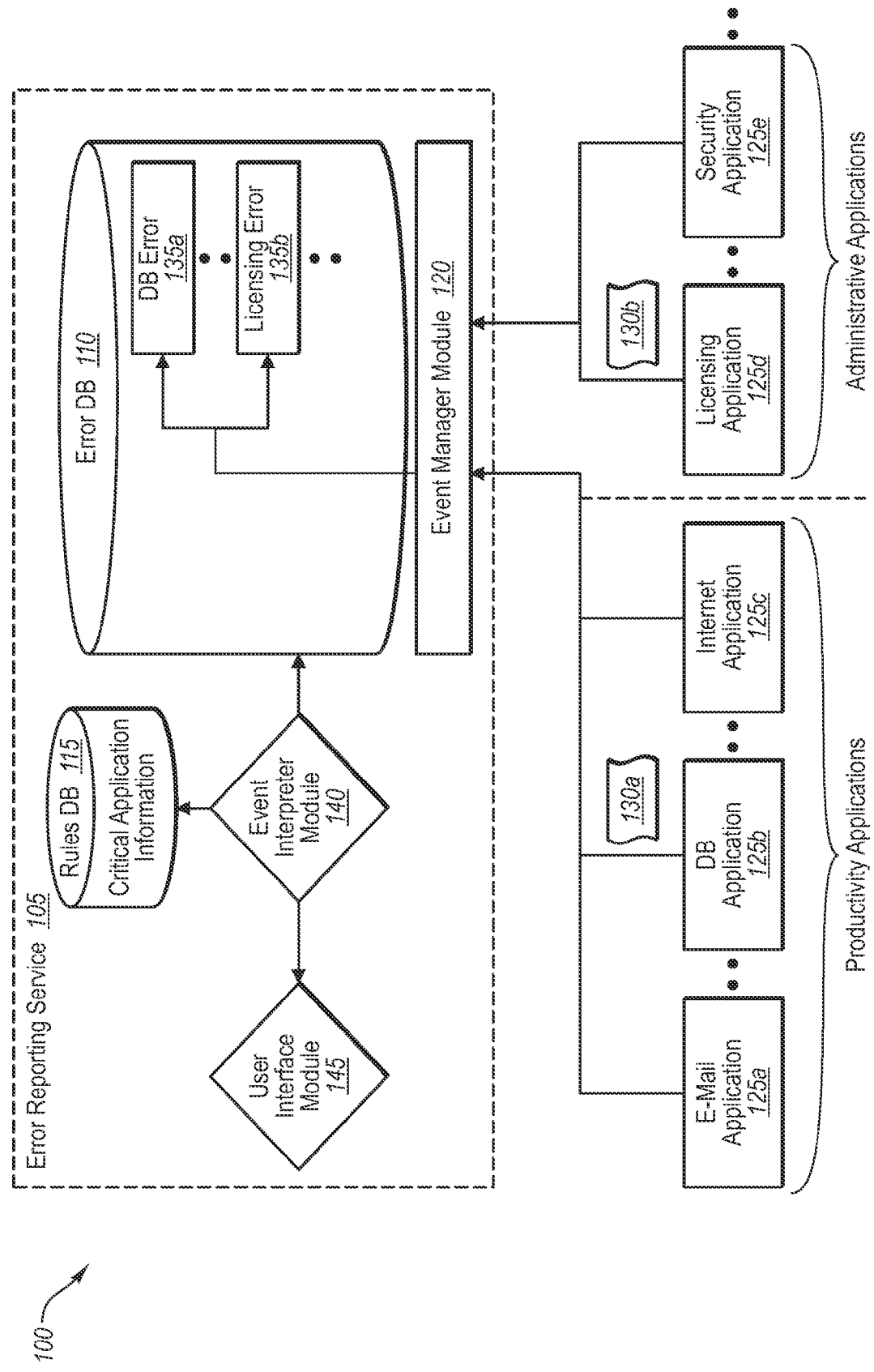
FIG. 1 illustrates an overview schematic diagram in accordance with an implementation of the present invention in which a plurality of distributed application programs provide status report information to a centralized error reporting service.

Implementations of the present invention extend to systems, methods, and computer program products configured to efficiently report various computer system operability metrics in a human-readable, easy to understand way. For example, one implementation of a system is configured to collect status reports (e.g., error reports) from one or more application programs into a centralized location, and interpret the error reports in terms of generalized, end-user tasks. The system then associates the generalized end-user tasks, such as sending and receiving email, or logging-in to a network, etc. with a positive or negative (or undetermined) designation. The system further includes one or more user interfaces (e.g., a dashboard) that continually display updated system health information, which indicates which generalized end-user tasks may be working properly, or otherwise implicated by problems identified with application components.

Accordingly, and as described more fully herein, implementations of the present invention present a "scenario-based health view" of a computerized system or computerized environment. That is, implementations of the present invention provide an end-to-end approach to solving system errors, such as by aggregating relevant error events and tying them to operational business functions at a level of complexity appropriate for the technical staff of smaller organizations. The automated, all-up overview health status of the important business functions can be very helpful to such technical staff, and has high value in such traditionally resource-challenged environments.

In general, and as also discussed more fully herein, there are at least four key operational business functions that are referred to herein as "generalized end-user tasks" that may be running or being performed in the computerized environment at any given time. These functions or end-user tasks can include logging-in to the network/domain, sending and receiving emails, accessing the internet, and performing or executing remote management. Each such business function or end-user task can then be associated with certain distributed application components that are essential to the performing the function or task, such as described more fully herein.

The system is further configured with certain monitoring rules so that each application component necessary to perform a given end-user task generates critical errors when the component fails. In one implementation, the critical errors that are generated can be configured to include an explanation of failure, the time of failure, some recommended corrective action, the status of the alert, and/or the ability to resolve the alert. In addition, and as also described more fully herein, implementations of the present invention are further set up to evaluate events that have the appropriate level of complexity in order for a smaller company's technical staff to resolve the problem. In one implementation, this means that the system will primarily or only fire off critical alerts that have a clearly identified action for the smaller company technical staff to perform.

FIG. 1 illustrates an overview schematic diagram of a computerized environment 100 in accordance with an implementation of the present invention. As shown, the computerized environment 100 includes at least a plurality of distributed application programs 125 (*a-e*, etc.) Each distributed application program 125, in turn, can include any number of one or more different application components that execute or handle performance of one or more different functions. In addition, FIG. 1 shows that the computerized environment comprises a centralized error reporting service 105. In general, the error reporting service 105 will be installed or otherwise located in such a way as to provide centralized error collection functionality. In one implementation, this will mean that the centralized error reporting service 105 is installed on a centralized network server. One will appreciate, however, that no particular network installation location is required, and the error reporting service 105 may also be distributed on several different servers.

FIG. 1 also shows that each distributed application program 125 in the system can be set up to be in communication with the error/status reporting service 105 via a single event manager module 120. For example, and as previously mentioned, each given distributed application program 125 in the organization's network can be configured or otherwise instrumented to fire off error/status reports at any given time, and further to deliver the reports to event manager module 120. In particular, the system administrator can install one or more additional modules or components, or otherwise couple one or more additional interfaces, when installing the distributed application programs 125. The additional modules, components or interfaces, in turn, are configured or otherwise instrumented to handle the application program's error/status reports (such as by replacing or intercepting messages from the default error reporting service). However configured, each application can be set up to ensure that all such error/status reports (e.g., 130) are sent to the event manager module 120.

As a preliminary matter, frequent reference is made herein to the term "error," such as with the terms "error report" or "error reporting service." For the purposes of this specification and claims, however, the term "error" is interchangeable with the term "status," since an error is understood as a special form of status. That is, a distributed application program 125 in accordance with the present invention can be configured to send one or more status reports 130 onward that include the negative connotation of "error" reports, but can also or alternatively include positively connoted information. For example, the application program 125 can send a status report to indicate that previously failed components are functioning properly.

In addition, just as there can be any number of reasons (positive, negative, or undetermined) for sending a status report, there can also be a number of ways for sending a status report. For example, in at least one implementation, each distributed application program 125 (a-e, etc.) is configured to send the status reports 130 (a-b, etc.) as an XML (extensible markup language) document that has been formatted with certain, specifically-defined fields. Of course, other markup languages and virtually any number of network communication protocols can be used in accordance with the present invention to communicate status information. To ensure consistency between the application programs, however, implementations of the present invention include installing one or more additional components with each application program 125 to ensure that status reports are properly formatted before being received by the event manager module 120.

As previously mentioned, a distributed application program 125 can include any number of different application program components that may or may not be installed on the same server, or even in the same server domain. Thus, when a given distributed application program 125 sends a status report 130 to event manager module 120, the status report 130 may be based on the execution status of one particular application component, or on the execution status of several different application components for that particular application program (e.g., 125a). Furthermore, some application program 125 components for a given application program can be configured to send their own status report 130 to the error reporting service 105 separately. As such, discussion or illustration herein with respect to a single application program 125 sending a status report 130 is done primarily by way of convenience.

In any event, and as previously described, FIG. 1 further shows that each distributed application program 125 is in communication with event manager module 120. Of these, FIG. 1 shows that application programs 125b and 125d (or one or more corresponding application components) have prepared and sent status reports 130a-b. For example, the given application program (e.g., 125b, 125d) may have a component that failed to initialize, or failed to detect another required application component. Alternatively, the given application program (125b, 125d) may be configured to check its own status of execution, and periodically send status updates every few minutes, regardless of proper or improper component execution.

Upon receipt of the given status reports 130, FIG. 1 shows that event manager module 120 then passes the information contained in the received status reports 139 to an error database 110. In one implementation, event manager module 120 simply stores the status report 130 as received in the error database 110. In additional or alternative implementations, however, event manager module 120 scans the information (e.g., the XML data fields) of the received status report 130 and stores the information from each report as a new record. For example, FIG. 1 shows that error database 110 comprises a record 135a and a record 135b, which correspond to the received status reports 130a and 130b (or the information contained therein). These database records 135a-b can then be parsed, interpreted, correlated, and otherwise translated in terms of generalized end-user tasks (or "business functions," previously described).

As previously mentioned, the term "generalized end-user task" (e.g., 240, FIGS. 2A-2B) can include the performance of such activities as logging-in to a network, sending and receiving email, accessing or using the internet (or internet applications), accessing or using an internal applications, accessing remote management services, or the like. The performance of such activities will typically involve execution of at least one, if not several different, distributed application component(s), and can even involve execution of several application components from several different distributed applications.

For example, a generalized end-user task of logging-in to a network can involve components from at least DB application 125b (e.g., an account management database service) and a security application 125e. Similarly, a generalized end-user task of sending and receiving email messages can involve components from all of the illustrated applications. For example, to initiate an email client, one or more components from the DB application 125b and licensing application 125d may need to verify that the user account is valid, and that the user account qualifies for a license to use the email program at the user's computer. Similarly, components of applications 125a, 125c, and 125e may also need to be executed to ensure that email messages are properly formatted, that the messages are sent and received across any network security boundaries, and the like.

Accordingly, one can appreciate that there can be a large number of different application components that are used for each generalized end-user task, and that some of these components might be more critical than others. For example, email application 125a components for appropriately formatting an email message may not be as critical for ultimate end-use or functionality compared with security application 125e components that ensure the messages are actually transmitted or received over a network boundary. Similarly, formatting components may not be as critical as licensing application components, which, if not properly authenticated, could result in failure of the email application to initialize in the first instance. Of course, whether a particular application component for any given application is termed critical or less-critical may be a decision made by a network administrator, or even by the developer of a given distributed application program 125.

In any event, the components or functions deemed critical for any given generalized end-user task can also be stored in a database. For example, FIG. 1 shows that error reporting service 105 can include a rules DB 115, which can be used to store one or more references of all components needed for a particular end-user task, as well as an indication of which such components are absolutely required for basic operation. Although FIG. 1 shows that rules DB 115 is separate from error DB 110, this is primarily by way of illustrative convenience. Specifically, the rules and critical information found in rules DB 115 may be combined or otherwise stored in error DB 110.

In addition, FIG. 1 shows that an event interpreter module 140 interfaces with rules DB 115 and error DB 110. In general, the event interpreter module 140 is configured to continually probe the error DB 110 to determine various status information about application 125 components. In one implementation, the event interpreter module 140 is configured to query error database 110 every few minutes, such as every 10-20 minutes, while, in other implementations, the event interpreter module 140 can be configured to query error database 110 every few seconds, or even every few hours, as needed. In some implementations, the event interpreter module 140 can be provided with a signal any time there is an update to error DB 110, rather than necessarily needing to perform periodic queries. For example, some components may execute far less frequently, or far more frequently than others, and so the way or frequency by which even interpreter module 140 receives or identifies information can be widely scaled.

In any event, an in at least one implementation, event interpreter module 140 can use the critical application information from rules DB 115 to form the query of error DB 110. For example a generalized end-user task for logging-in to the network may comprise execution of as many as ten different application components, of which only four or five are actually required for basic operation. In at least one implementation, therefore, the event interpreter module 140 can identify whatever set of application components are of interest from rules DB 115, and then query error DB 110 (or otherwise be set up to receive updates) to determine the operating status of the identified application components.

The event interpreter module 140 can then coordinate the received, queried status information in error DB 110 with each generalized end-user task (e.g., as related by rules DB 115). For example, the event interpreter module 140 can identify an error from records 135a and 135b with one or more components in the DB application 125b and licensing application 125d. The event interpreter module 140 can then determine, such as based on information in rules DB 115, that these errors implicate the generalized end-user task of logging-in to the network. The event interpreter module 140 then prepares corresponding output for display. In particular, the event interpreter module 140 can prepare one or more reports with one or more critical error alerts, as well as an indication that these critical errors will impede user logins. The event interpreter module 140 then passes this information onto user interface module 145.

User interface module 145 then prepares, formats, and otherwise passes the output of event interpreter module 140 to a computerized graphical output display. For example, the user interface module 145 can send one or more instructions to display the output from event interpreter module 140 as a selectable, interactive "dashboard" (e.g., 200, FIGS. 2A-2B). In particular, and in at least one implementation, the graphical output display can take on the form of a dashboard-style user interface.

In one implementation, the dashboard-style user interface is configured to immediately tell (or otherwise identify to) the user (e.g., network administrator) how critical errors in the system may be affecting the performance of generalized end-user tasks. For example, and continuing from the scenario above, the dashboard can include a main user interface, with selectable alert categories, which, when expanded, describe which (if any) application components and end-user tasks are associated therewith. The displayed data can be configured to change on the user interface depending on the results of the various, ongoing status changes within error DB 110.

Figure 2A:
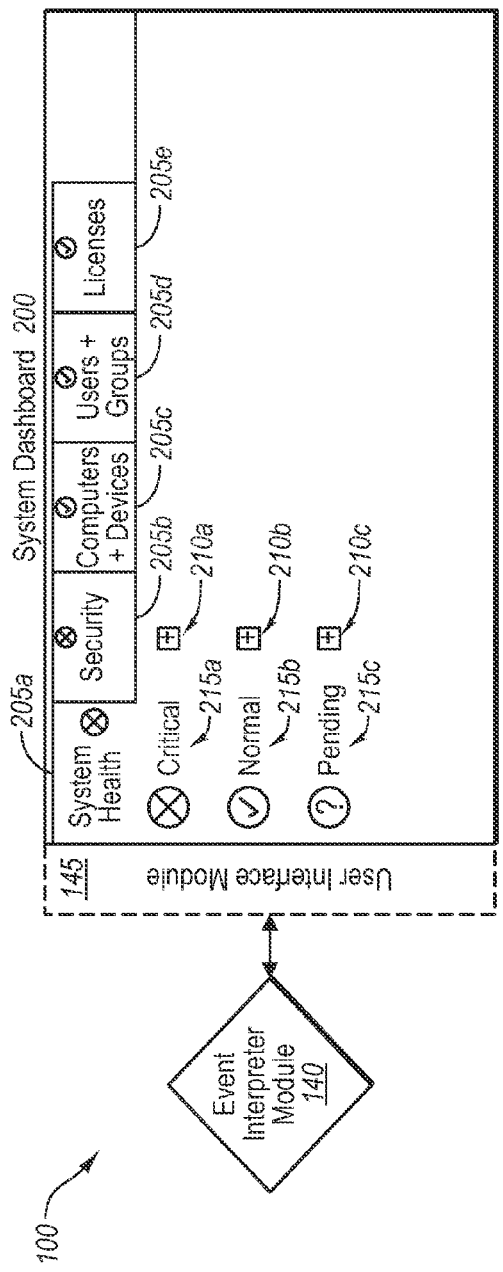
FIG. 2A illustrates a schematic diagram in accordance with an implementation of the present invention in which a graphical user interface is used to display the overall health status of a system by generalized categories.
Figure 2B:
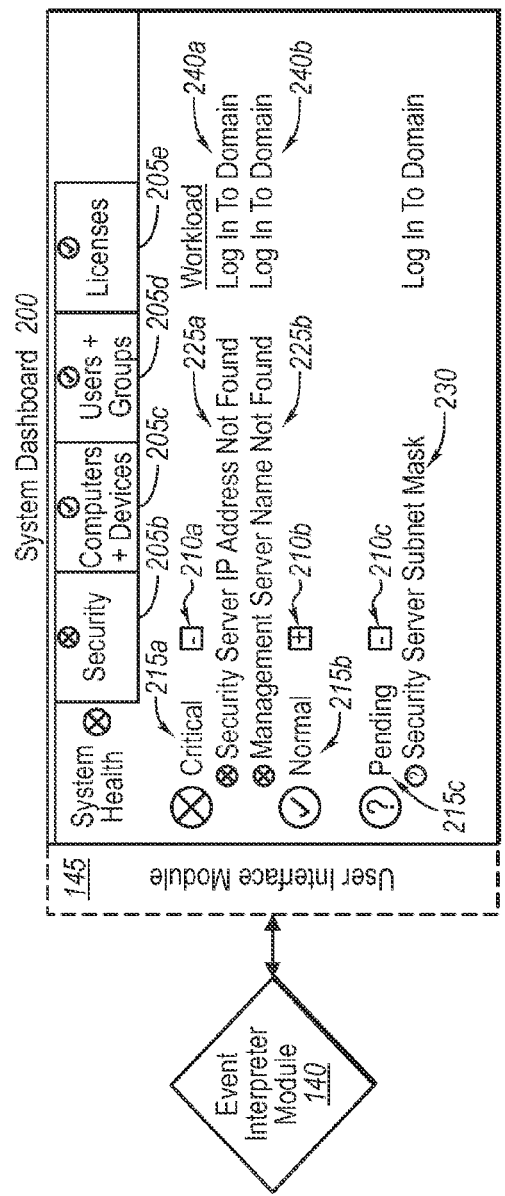
FIG. 2B illustrates the graphical user interface of FIG. 2A in which a user has expanded one or more of the dashboard lists therein to identify distributed application program components and end-user tasks associated with those components.

For example, as shown in FIGS. 2A and 2B, a generalized dashboard 200 interface can comprise a main user interface with a plurality of different categorized system tabs (or categorized system health tabs). For example, FIG. 2A shows that dashboard 200 comprises a "System Health" tab 205a, a "Security" tab 205b, a "Computer and Devices" tab 205c, a "Users and Groups" tab 205d, and a "Licenses" tab 205e. As shown, each of these includes the updatable display of a status indicator above the tab names, which indicates whether there are any current issues requiring further inspection within that generalized category. For example, FIG. 2A shows that tabs 205a and 2-5b are associated with a negative status indicator (e.g., an "x"), while tabs 205c, 205d, and 205e are associated with a positive status indicator (e.g., a check mark).

In the illustrated implementation, FIG. 2A shows that selection of a given tab 205 further provides categorized information based on whether there are alerts associated with a positive or negative (or pending) status indicator. For example, FIG. 2A shows that selection of system health tab 205a causes display on an initial user interface of selectable categories, such as a selectable "Critical" category 215a, a selectable "Normal" category 215b, and a selectable "Pending" category 215c. The critical category 215a, when selected (e.g., via expansion button 210a) can provide a list of all application components (or summary of corresponding operations) for which critical alerts have been received, while the normal category, when selected (e.g., via expansion button 210b) would provide a list of all other application components (or summary of corresponding operations) that are running as expected. Similarly, selection of the pending category 215c (e.g., via expansion button 210c) would provide a list of all application components (or summary of corresponding operations) for which a status is currently undetermined.

Along these lines, FIG. 2B illustrates additional details regarding what can occur when a user selects any of categories 215a-c. For example, FIG. 2B shows that, upon selection of expansion button 210a, dashboard 200 displays alerts associated with various component operations. In particular, FIG. 2B shows that the dashboard 200 displays alert 225a, indicating "Security Server IP Address Not Found" and alert 225b, indicating "Management Server Name Not found." In addition to the foregoing, FIG. 2B shows that dashboard 200 also displays the generalized end-user task context associated with these alerts. In particular, FIG. 2B shows that each alert 225a and 225b, in this example, is described in terms of a "Workload" action 240a and 240b, respectively. In this case, the dashboard 200 indicates that critical alerts 225a and 225b pertain to a user's ability to log-in to the domain.

Similarly along these lines, FIG. 2B shows that the user has expanded the "pending" category 215c by selecting expansion button 210c. This causes dashboard 200 to display via alert/message 230 that there is still a pending request (or otherwise that the status is unidentified) for determining the "Security Server Subnet Mask." As with alerts 225a and 225b, FIG. 2B also shows that alert 230 is associated with the workload description of logging-in to the domain. Accordingly, a network administrator looking at the user interface dashboard 200 of FIG. 2B will readily identify there are several different application component errors that are likely to affect or otherwise prohibit users from performing the generalized end-user task of logging-in to the network.

In one implementation, the user can further select each of these different alerts in one form or another to identify a suggested course of action. For example, selection of alert 225a or 225b might result in the display of still another user interface, which details the application programs and/or file names of corresponding application program components that are causing the error. Furthermore, this interface can indicate what time the error occurred, and might further suggest possible solutions for the errors, such as rebooting the components, changing address or name information in the files, or the like. The network administrator can then use this information to quickly perform any fixes that are necessary on the identified files.

In at least one implementation, and upon fixing the errors, the relevant application programs 125 will eventually send a status report 130, or some other appropriate signal, to event manager module 120, which indicates a change in status (i.e., from "not executing" to "executing"). Event interpreter module 140 can then identify the status change, such as when performing a routine query of error DB 110 (or upon receiving an updated signal from error DB 110). Event interpreter module 140 can then send the change to user interface module 145, which in at least one implementation results in removal of the alert in the dashboard 200 to reflect fixing the alert.

As such, one will appreciate that there are a number of ways such changes in status can be reflected in dashboard 200. For example, dashboard 200 can be configured to display only those alerts and/or categories for which there is relevant information to report. In particular, if there are no critical alerts and/or no pending alerts that require attention, the dashboard 200 of FIG. 2A might be displayed differently, such as to only show the normal category 215b. That is, in at least one implementation, the critical category 215a and pending category 215c can be omitted from display since there are no underlying critical or pending alerts to view. Furthermore, the categorized tab 205a could be displayed differently to show a check mark, rather than the displayed warning or "x" sign, much like with tabs 205c-e.

Accordingly, FIGS. 1 through 2B and the corresponding description illustrate or describe a number of different schematics and components for efficiently and effectively relaying error information to technical staff. Furthermore, FIGS. 1 through 2B illustrate or describe a number ways in which the computerized systems/environment can help technical staff immediately identify what are the implications of any error reports, and how to solve them. In addition to the foregoing, implementations of the present invention can also be described in terms of flowcharts comprising one or more acts in a method for accomplishing a particular result. For example, FIG. 3 illustrates a flowchart in accordance with an implementation of the present invention for determining the status of one or more end-user tasks based on collected status reports, while FIG. 4 illustrates a flowchart for displaying the status of one or more end-user tasks in a graphical user interface. The flowcharts of FIGS. 3 and 4 are described more fully below with respect to the schematic diagrams and components shown in FIGS. 1-2B.

For example, FIG. 3 shows that a method of determining the status of one or more end-user tasks can comprise an act 300 of identifying one or more end-user tasks. Act 300 includes identifying one or more end-user tasks to be performed in a computerized environment, wherein each of the one or more end-user tasks involve execution of a corresponding set of one or more distributed application components. For example, a network administrator, or even an automated entity, can correlate all application program components that are implicated with a generalized end-user task, such as logging-in to a network, sending and receiving email, or the like. This information can then be stored for later use in a database, such as in a rules DB 115.

FIG. 3 also shows that the method can comprise an act 310 of receiving one or more status reports. Act 310 includes receiving one or more status reports from the plurality of distributed application programs, the one or more status reports providing information regarding execution of one or more distributed application program components. For example, FIG. 1 shows that applications 125b and 125d send corresponding status reports 130a or 130b to error reporting service 105 via event manager module 130.

In addition, FIG. 3 shows that the method can comprise an act 320 of correlating the status report information with the end-user tasks. Act 320 includes correlating the information of the one or more status reports with the one or more end-user tasks. For example, FIG. 1 shows that event interpreter module 140, which is in communication with rules DB 115, queries error DB 110 (e.g., on a periodic basis) and identifies that there are new error records 135a and 135. Event interpreter module 140 determines, based on the information of rules DB 115, that the error information in records 135a and 135b pertain to a particular end-user task, such as the task of logging-in to the network.

Furthermore, FIG. 3 shows that the method can comprise an act 330 of associating a positive or negative status with each end-user task. Act 330 includes associating a positive, negative, or pending status with at least one of the one or more end-user tasks based on the correlated information, wherein the status indicates whether the corresponding end-user task can be performed. For example, event interpreter module 140 creates one or more alerts from the identified errors in the status report information in error DB 110, and associates a positive, negative, or pending status indicator with the alerts. Thus, the reported alerts readily identify to a human administrator that there may be a problem with performing one or more corresponding/relevant end-user tasks (e.g., users cannot log-in to the network, etc.)

In addition to the foregoing, FIG. 4 illustrates that a method of displaying the status of one or more end-user tasks in a graphical user interface can comprise an act 400 of identifying a minimum set of application components for an end-user task. Act 400 includes identifying one or more distributed application programs and a minimum set of one or more distributed application components corresponding to performance of any one or more generalized end-user tasks in a computerized environment. As previously mentioned, for example, a network administrator (or technical staff, or even an automated entity) determines which application program components are required for performing a particular end-user task such as logging-in to a network, or sending and receiving email, etc.

FIG. 4 also illustrates that the method can comprise an act 410 of querying a centralized database regarding application component status. Act 410 includes querying a centralized database comprising one or more status reports received from the one or more distributed application programs. For example, FIG. 1 shows that event interpreter module 140 queries error DB 110 to identify the most relevant or up-to-date information in the system 100.

In addition, FIG. 4 illustrates that the method can comprise an act 420 of determining a positive or negative status for the end-user task. Act 420 includes determining from the results of the query a recent positive, negative, or pending status of at least one end-user task. For example, event interpreter module 140, such as in conjunction with information gleaned in rules DB 115, determines that there is either errant or missing information, which will ultimately prevent users from logging-in to a network, or sending and receiving email, etc. The event interpreter module 140 then prepares one or more alerts and the end-user tasks implicated thereby.

Furthermore, FIG. 4 illustrates that the method can comprise an act 430 of displaying the positive or negative indicator through a user interface. Act 430 includes displaying through a graphical user interface a positive or negative indicator associated with the at least one end-user task, wherein the positive or negative indicator indicates whether users in the computerized environment can perform the end-user task. For example, FIGS. 2A and 2B show that dashboard 200 displays a number of system health tabs and corresponding status identifiers, such as an "x," or a checkmark, etc. These status identifiers, in turn, reflect the status of alerts within these generalized tab categories. For example, as shown in FIG. 2B, the system health tab 205a, which has an "x" associated therewith, further has a number of selectable categories, which indicate the type of alerts, and the potential end-user tasks that are implicated with these alerts.

Accordingly, FIGS. 1-4 provide a number of schematics, components, and mechanisms for efficiently presenting and solving system errors in a computerized environment without necessarily requiring highly specialized training with each particular application program in the system 100. Due at least in part to the simplicity of display and correlation between errors, tasks, and solutions, one will appreciate that implementations of the present invention can solve many of the difficulties in translation typically encountered in small and mid-sized organizations. In particular, technical staff can readily understand and solve many of the application-specific errors presented by the computer systems, and can readily relate end-user problems with generalized tasks to specific applications and/or specific application components within the organization's network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized environment comprising a plurality of distributed application programs configured to generate one or more application-specific status reports, a method of automatically determining a positive, negative, or pending status of one or more generalized, end-user tasks to be performed, comprising the acts of:
    identifying one or more end-user tasks to be performed in a computerized environment, wherein each of the one or more end-user tasks involves execution of a corresponding set of one or more distributed application components;
    receiving one or more status reports from the plurality of distributed application programs, the one or more status reports providing information regarding execution of one or more distributed application program components;
    correlating the information of the one or more status reports with the one or more identified end-user tasks;
    associating a positive, negative, or pending status with at least one of the one or more identified end-user tasks based on the correlated information, wherein the status indicates whether the corresponding end-user task can be performed; and
    displaying a plurality of tabs through the graphical user interface that describe a different aspect of the computerized environment, wherein each categorized tab comprises a displayed status indicator that indicates whether end-user tasks corresponding to that tab are functioning properly, failing, or undetermined.

2. The method as recited in claim 1, wherein the set of one or more distributed application components includes a plurality of application components from different distributed application programs.

3. The method as recited in claim 1, further comprising identifying a minimum set of application components that are required for performance of at least one end-user task.

4. The method as recited in claim 3, wherein correlating the information of the one or more status reports with the one or more end-user tasks comprises correlating the information of the one or more status reports only with the minimum set of application components.

5. The method as recited in claim 1, wherein the end-user task comprises sending and receiving email through an email application program, or accessing the internet through an internet browser application program.

6. The method as recited in claim 1, further comprising querying a database of the information corresponding to the received one or more status report to determine an updated positive, negative, or pending status for each end-user task.

7. The method as recited in claim 6, further comprising the acts of:
    identifying that one or more application components corresponding to an end-user task have failed;
    preparing one or more alerts that associate the end-user task with a negative status indicator, wherein the one or more alerts describe the end-user task that is affected by one or more failed application components; and
    sending the one or more alerts for display in a graphical user interface.

8. The method as recited in claim 7, wherein the one or more alerts include an indication of a time of the failure, and an explanation of the failure in the one or more failed application components.

9. The method as recited in claim 7, wherein the one or more alerts include recommended corrective action to be taken on the one or more failed application components.

10. The method as recited in claim 7, further comprising the acts of:
    querying the database again to identify a new status for the one or more application components that have failed;

identifying that the failed one or more application components are now executing properly; and sending new display instructions to the graphical user interface based on the end-user task.

11. The method as recited in claim 10, wherein the new display instructions include instructions to remove the prior one or more prepared alerts from the user interface.

12. The method as recited in claim 10, wherein the new display instructions include instructions to change display of the user interface to show that the one or more alerts have been resolved.

13. In a computerized environment in which a plurality of end-users perform one or more generalized end-user tasks through a plurality of distributed application programs and corresponding distributed application program components, a method of displaying one or more status indicators that identify whether the generalized end-user tasks can be performed, comprising the acts of:

identifying one or more distributed application programs and a minimum set of one or more distributed application components corresponding to performance of any one or more generalized end-user tasks in a computerized environment;

querying a centralized database comprising information corresponding to one or more status reports received from the one or more distributed application programs;

determining from the results of the query a recent positive, negative, or pending status of at least one end-user task;

displaying through a graphical user interface the determined positive, negative, or pending status indicator associated with the at least one end-user task, wherein the positive or negative indicator indicates whether users in the computerized environment can perform the end-user task; and displaying a plurality of tabs through the graphical user interface that describe a different aspect of the computerized environment, wherein each categorized tab comprises a displayed status indicator that indicates whether end-user tasks corresponding to that tab are functioning properly, failing, or undetermined.

14. The method as recited in claim 13, further comprising displaying one or more corrective actions to be taken to resolve the one or more alerts so that the one or more implicated end-user tasks can be performed.

15. The method as recited in claim 13, wherein selection of each tab displays a new user interface corresponding to a different set of end-user tasks.

16. The method as recited in claim 13, further comprising the acts of:

displaying a negative indicator with one or more alerts and at least one end-user task that is implicated by the one or more alerts;

querying anew the centralized database for updates to the information corresponding to the application components that have failed; and based on the new query, displaying a positive indicator with the one or more alerts and at least one end-user task implicated by the one or more alerts.

17. The method as recited in claim 13, further comprising displaying one or more status categories corresponding to application component status, wherein selection of any of the displayed status categories results in display of one or more alerts corresponding to the selected status category.

18. The method as recited in claim 17, further comprising, upon receiving a selection of one of the status categories in the display:

displaying one or more alerts corresponding to the status category; and displaying one or more end-user tasks implicated by the one or more alerts.

19. In a computerized environment comprising a plurality of distributed application programs configured to generate one or more application-specific status reports, a computer program product having computer-executable instructions stored thereon that, when executed, cause one or more processors to perform a method comprising:

identifying one or more end-user tasks to be performed in a computerized environment, wherein each of the one or more end-user tasks involves execution of a corresponding set of one or more distributed application components;

receiving one or more status reports from the plurality of distributed application programs, the one or more status reports providing information regarding execution of one or more distributed application program components;

correlating the information of the one or more status reports with the one or more identified end-user tasks;

associating a positive, negative, or pending status with at least one of the one or more identified end-user tasks based on the correlated information, wherein the status indicates whether the corresponding end-user task can be performed; and displaying a plurality of tabs through the graphical user interface that describe a different aspect of the computerized environment, wherein each categorized tab comprises a displayed status indicator that indicates whether end-user tasks corresponding to that tab are functioning properly, failing, or undetermined.

20. In a computerized environment comprising a plurality of distributed application programs configured to generate one or more application-specific status reports, a method of automatically determining a positive, negative, or pending status of one or more generalized, end-user tasks to be performed, comprising the acts of:

identifying one or more end-user tasks to be performed in a computerized environment, wherein each of the one or more end-user tasks involves execution of a corresponding set of one or more distributed application components;

receiving one or more status reports from the plurality of distributed application programs, the one or more status reports providing information regarding execution of one or more distributed application program components;

correlating the information of the one or more status reports with the one or more identified end-user tasks;

associating a positive, negative, or pending status with at least one of the one or more identified end-user tasks based on the correlated information, wherein the status indicates whether the corresponding end-user task can be performed;

querying a database of the information corresponding to the received one or more status report to determine an updated positive, negative, or pending status for each end-user task;

identifying that one or more application components corresponding to an end-user task have failed;

preparing one or more alerts that associate the end-user task with a negative status indicator, wherein the one or more alerts describe the end-user task that is affected by one or more failed application components; and sending the one or more alerts for display in a graphical user interface, wherein the one or more alerts include recommended corrective action to be taken on the one or more failed application components.

21. In a computerized environment in which a plurality of end-users perform one or more generalized end-user tasks through a plurality of distributed application programs and corresponding distributed application program components, a method of displaying one or more status indicators that identify whether the generalized end-user tasks can be performed, comprising the acts of:

identifying one or more distributed application programs and a minimum set of one or more distributed application components corresponding to performance of any one or more generalized end-user tasks in a computerized environment;

querying a centralized database comprising information corresponding to one or more status reports received from the one or more distributed application programs;

determining from the results of the query a recent positive, negative, or pending status of at least one end-user task;

displaying through a graphical user interface the determined positive, negative, or pending status indicator associated with the at least one end-user task, wherein the positive or negative indicator indicates whether users in the computerized environment can perform the end-user task; and displaying one or more corrective actions to be taken to resolve the one or more alerts so that the one or more implicated end-user tasks can be performed.

* * * * *